United States Patent
Lee

(10) Patent No.: US 7,034,799 B2
(45) Date of Patent: Apr. 25, 2006

(54) BACKLIGHTING DEVICE FOR DUAL LIQUID CRYSTAL DISPLAY AND FOLDER-TYPE MOBILE PHONE THEREWITH

(75) Inventor: Seog-Geun Lee, Kumi-shi (KR)

(73) Assignee: Samsung Electronics Co., Ltd., (KR)

( * ) Notice: Subject to any disclaimer, the term of this patent is extended or adjusted under 35 U.S.C. 154(b) by 330 days.

(21) Appl. No.: 10/268,565

(22) Filed: Oct. 10, 2002

(65) Prior Publication Data

US 2003/0112217 A1    Jun. 19, 2003

(30) Foreign Application Priority Data

Dec. 14, 2001 (KR) ............................. 2001-79241
Jan. 12, 2002 (KR) ............................. 2002-1931

(51) Int. Cl.
    *G09G 3/36*    (2006.01)
(52) U.S. Cl. ..................... 345/102; 345/4; 345/5; 345/6; 349/112
(58) Field of Classification Search ........ 349/112, 349/61–71; 345/4–6, 102; 455/403, 566, 455/560

See application file for complete search history.

(56) References Cited

U.S. PATENT DOCUMENTS

| 5,105,186 | A | * | 4/1992 | May .......................... 345/175 |
| 5,254,905 | A | * | 10/1993 | Dunbar et al. ............. 313/495 |
| 5,375,043 | A | * | 12/1994 | Tokunaga ................... 362/31 |
| 2002/0015807 | A1 | * | 2/2002 | Sugino et al. ............. 428/1.31 |

FOREIGN PATENT DOCUMENTS

| EP | 0 775 933 | | 5/1997 |
| GB | 2343324 A | * | 5/2000 |
| KR | 2001-0035369 | | 5/2001 |

* cited by examiner

*Primary Examiner*—Sumati Lefkowitz
*Assistant Examiner*—Ke Xiao
(74) *Attorney, Agent, or Firm*—Dilworth & Barrese LLP

(57) ABSTRACT

Disclosed is a backlighting device for a dual LCD (Liquid Crystal Display). The backlighting device includes a circuit board with a through hole; a backlighting illumination device situated within the hole for radiating light in a first direction substantially perpendicular to a first face of the circuit board and in a second direction substantially perpendicular to a second face of the circuit board; a main LCD being situated on one face of the backlighting illumination device in the first direction, for displaying first information in the first direction; and a slave LCD being situated on another face of the backlighting illumination device through the through hole in the second direction, for displaying second information in the second direction.

14 Claims, 5 Drawing Sheets

BACKLIGHTING DEVICE FOR DUAL LIQUID CRYSTAL DISPLAY AND FOLDER-TYPE MOBILE PHONE THEREWITH

PRIORITY

This application claims priority to an application entitled "Backlighting Device for Dual Liquid Crystal Display and Mobile Phone Therewith" filed in the Korean Industrial Property Office on Dec. 14, 2001 and assigned Serial No. 2001-79241, the contents of which are hereby incorporated by reference. This application also claims priority to an application entitled "Backlighting Device for Dual Liquid Crystal Display An Folder-Type Mobile Phone Therewith" filed in the Korean Industrial Property Office on Jan. 12, 2002 and assigned Serial No.: 2002-1931, the contents of which are hereby incorporated by reference.

BACKGROUND OF THE INVENTION

1. Field of the Invention

The present invention relates generally to portable terminals including cellular phone, digital phone, PDA (Personal Digital Assistant), and HHP (Hand-Held Phone), and in particular, to a backlighting device for a dual Liquid Crystal Display (LCD) and a folder-type mobile phone therewith.

2. Description of the Related Art

In general, as more and more personal mobile communication services are introduced, services employing mobile telephones are quite diversified, and accordingly, designs and functions of the mobile phone are rapidly changing. In particular, the latest folder-type mobile phone has two Liquid Crystal Displays (LCDs), one mounted on the inside on an inner surface of a folder and another mounted on the outside on an outer surface of the folder so that a user can conveniently check simple information or status information of the mobile phone through the LCD mounted on the outer surface of the folder without opening the folder.

FIG. 1A is a perspective view of a folder-type mobile phone on which a typical dual LCD is mounted, and FIG. 1B is a perspective view showing a folded state of the folder-type mobile phone illustrated in FIG. 1A. As illustrated in FIG. 1A, a typical folder-type mobile phone 100 includes a body 110 and a folder 160 rotatably connected to the body 110 by an undepicted hinge. The body 110 includes a mouthpiece 120 with a microphone, and a keypad 130 comprised of a key matrix for inputting. The folder 160 is comprised of a main LCD 170 facing the body 110, and an earpiece 180 with a built-in speaker (not shown). Further, as illustrated in FIG. 1B, the folder 160 has a slave LCD 190 mounted on an outer surface thereof. The main LCD 170 and the slave LCD 190, constituting a dual-LCD display device of the mobile phone 100, display a telephone number being dialed, status information of the mobile phone 100, and a variety of other information set by the user. The slave LCD 190 can also display simple information such as date, time, battery status indication icon, antenna reception sensitivity icon, etc.

FIG. 2 is a cross sectional view illustrating a structure of a known LCD used as the main LCD and the slave LCD illustrated in FIGS. 1A and 1B. As illustrated in FIG. 2, a known LCD 200 has liquid crystal 210, an upper glass 230, and a lower glass 250. The upper and lower glasses 230 and 250 are attached on upper and lower faces of the liquid crystal 210, respectively. An upper polarizer 270 is attached on the upper glass 230 and a lower polarizer 290 is attached on the lower glass 250. As the LCD 200 is controlled by an LCD driver (not illustrated herein), the user can visually identify displayed information. In addition, a backlighting device is provided to enable the user to view a variety of information displayed on the LCD in dark places or at night.

FIG. 3 is a cross sectional view of a dual LCD for a mobile phone with two separate backlighting devices according to the prior art. As illustrated in FIG. 3, a conventional dual LCD 300 with backlighting devices 320 and 330 has a main LCD 311 installed on one face of a circuit board 301 and a slave LCD 313 installed on another face. The backlighting devices 320 and 330 are constructed between the main LCD 311 and the circuit board 301 and between the slave LCD 313 and the circuit board 301, respectively, in the same manner.

The backlighting device 320 has a diffusion sheet 321 attached on a lower face of the main LCD 311, a light guide plate 323 attached on a lower face of the diffusion sheet 321, and a reflection plate 325 attached on a lower face of the light guide plate 323, the reflection plate 325 being coupled with the circuit board 301. In addition, a light emitting diode (LED) 327 is installed adjacent to the light guide plate 323, and the light emitted by the LED 327 is flashed on the main LCD 311. Light generated at the LED 327 is transferred to the light guide plate 323, reflected by the reflection plate 325, and transferred to the main LCD 311. The light transferred to the main LCD 311 is evenly diffused across the main LCD 311 by the diffusion sheet 321. A white, blue, or red light emitting diode can be used for the LED 327.

The backlighting device 330 of the slave LCD 313 is constructed in the same manner as the backlighting device 320 of the main LCD 311. Accordingly, construction of the backlighting device 330 of the slave LCD 313 needs not be elaborated herein, for simplicity.

FIG. 4 is a cross sectional view of another dual LCD for a mobile phone with two separate backlighting devices according to the prior art. As illustrated in FIG. 4, a conventional dual LCD 400 with backlighting devices 420 and 430 has a main LCD 411 installed on one face of a circuit board 401 and a slave LCD 413 on another face of the circuit board 401, and the backlighting devices 420 and 430 are constructed between the main LCD 411 and the circuit board 401 and between the slave LCD 413 and the circuit board 401, respectively, in the same manner.

The backlighting device 420 has a diffusion sheet 421 attached at the lower part of the main LCD 411, an electro-luminescence (EL) sheet 423 attached at the lower part of the diffusion sheet 421, and a reflection sheet 425 attached at the lower part of the EL sheet 423, the reflection sheet 425 being coupled with the circuit board 401. Further, being an active light-emitting element, the electro-luminescence sheet 423 generates light for illuminating the main LCD 411, and the light emitted by the electro-luminescence sheet 423 flashes on the main LCD 411. Light generated at the electro-luminescence sheet 423 is reflected by the reflection sheet 425 and transferred to the main LCD 411. Here, the light transferred to the main LCD 411 is evenly diffused across the whole surface of the main LCD 411 by the diffusion sheet 421.

The backlighting device 430 for the slave LCD 413 is constructed in the same manner as the backlighting device 420 of the main LCD 411. Accordingly, construction of the backlighting device 430 of the slave LCD 412 needs not be elaborated herein, for simplicity.

A backlighting device for a dual LCD may be constructed by combining the backlighting device using the light emitting diode as a light source with the backlighting device using the electro-luminescence sheet as a light source.

In the foregoing examples, the backlighting device requires installation of light emitting diode or electro-luminescence sheet as a light source, diffusion sheet, and reflection plate both in the main LCD and the slave LCD separately in a symmetric manner, giving a serious limitation in making the mobile phone compact and especially, slim.

Specifically, the dual LCD is applied mainly to folder-type mobile phones, so the backlighting devices with the same construction have to be separately installed in both the main LCD and the slave LCD, making the folder thicker. In addition, when using different light sources for main LCD and slave LCD, for example, when using the electro-luminescence sheet as a light source for the main LCD and the light emitting diode as a light source for the slave LCD, a control circuit for controlling the light sources needs to be separately constructed, making the control circuit complicated and impeding compactness of the mobile phone.

SUMMARY OF THE INVENTION

It is, therefore, an object of the present invention to provide a backlighting device for a dual LCD capable of slimming a mobile phone by reducing the number of parts, and a folder-type mobile phone therewith.

To achieve the above and other objects, the present invention provides a backlighting device for a dual LCD. The backlighting device includes a circuit board with a through hole; a backlighting illumination device being situated on the through hole and circumference of one face of the circuit board adjacent to the through hole, for radiating light in a first direction substantially perpendicular to one face of the circuit board and in a second direction substantially perpendicular to another face of the circuit board; a main LCD being situated on one face of the backlighting illumination device in the first direction, for displaying first information in the first direction; and a slave LCD being situated on another face of the backlighting illumination device through the through hole in the second direction, for displaying second information in the second direction.

Further, the present invention provides a folder-type mobile phone with a backlighting device for a dual LCD. The folder-type mobile phone includes (i) a body; (ii) the backlighting device including a circuit board with a through hole; a backlighting illumination device situated on the through hole and circumference of one face of the circuit board adjacent to the through hole, for radiating light in a first direction substantially perpendicular to the one face of the circuit board and in a second direction substantially perpendicular to another face of the circuit board; a main LCD situated on one face of the backlighting illumination device in the first direction, for displaying first information in the first direction; a slave LCD situated on another face of the backlighting illumination device through the through hold in the second direction, for displaying second information in the second direction; and (iii) a folder rotatably foldable to the main body by a hinge device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1A:
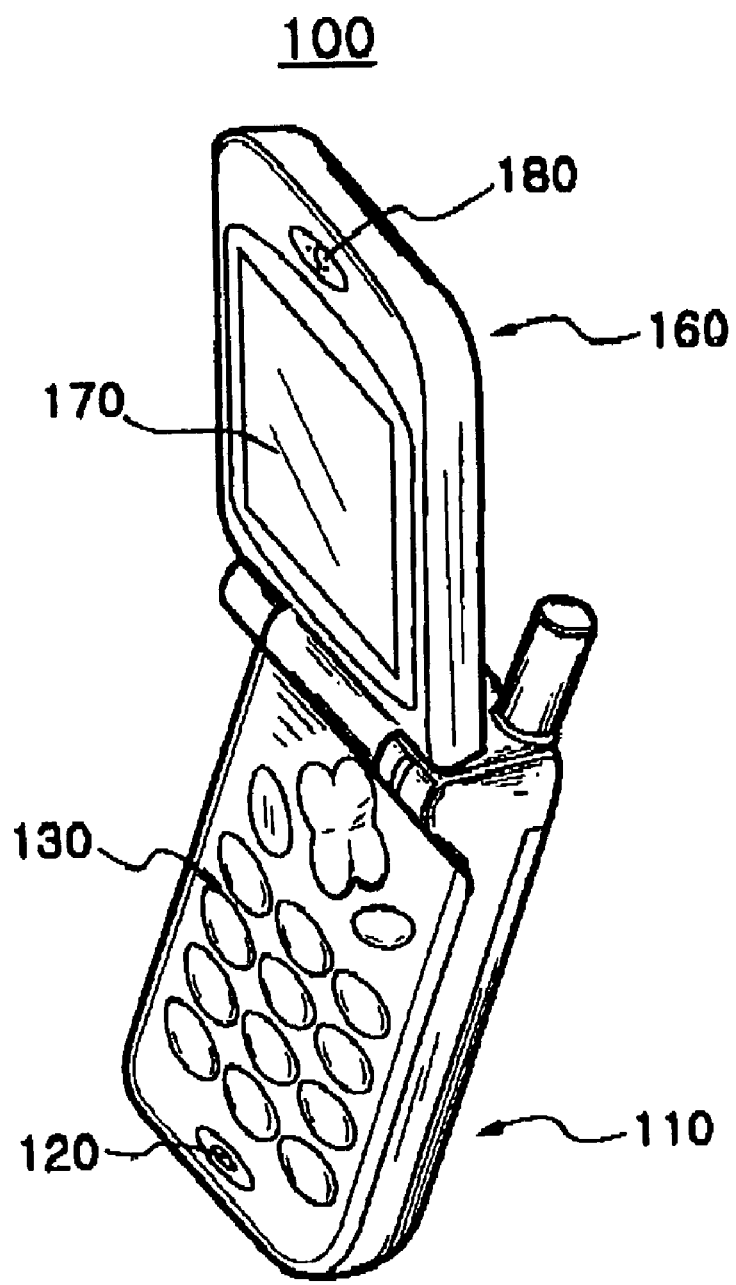
FIG. 1A is a perspective view illustrating a folder-type mobile phone with a folder having a typical dual LCD.
Figure 1B:
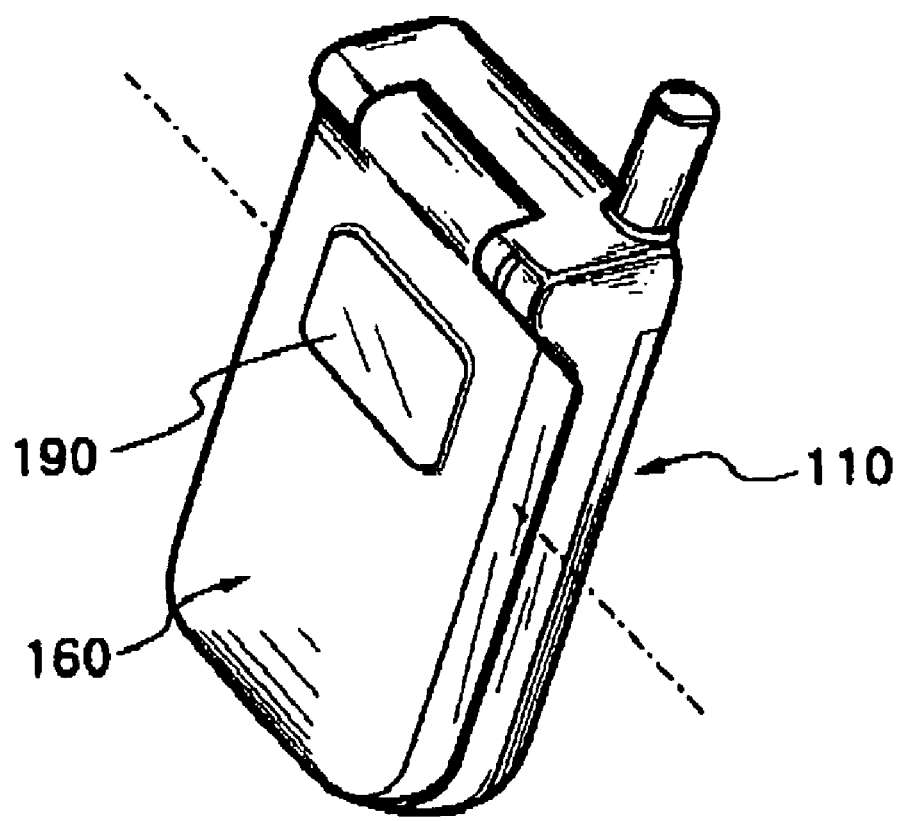
FIG. 1B is a perspective view illustrating the folder-type mobile phone of FIG. 1A, with the folder folded.
Figure 2:
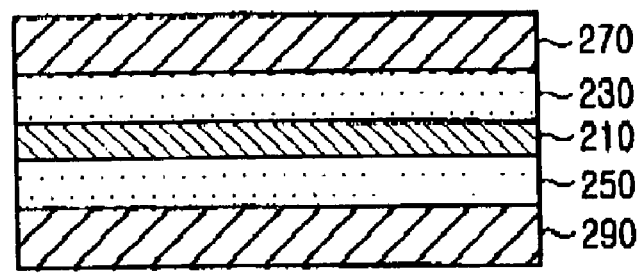
FIG. 2 is a cross sectional view illustrating a structure of a general LCD.
Figure 3:
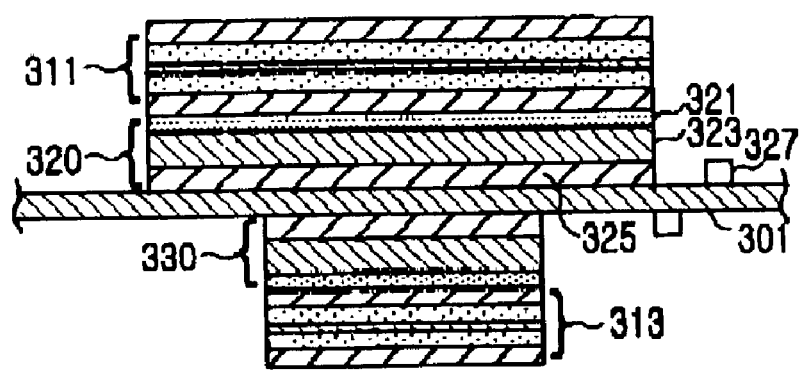
FIG. 3 is a cross sectional view illustrating a dual LCD with two separate backlighting devices according to the prior art.
Figure 4:
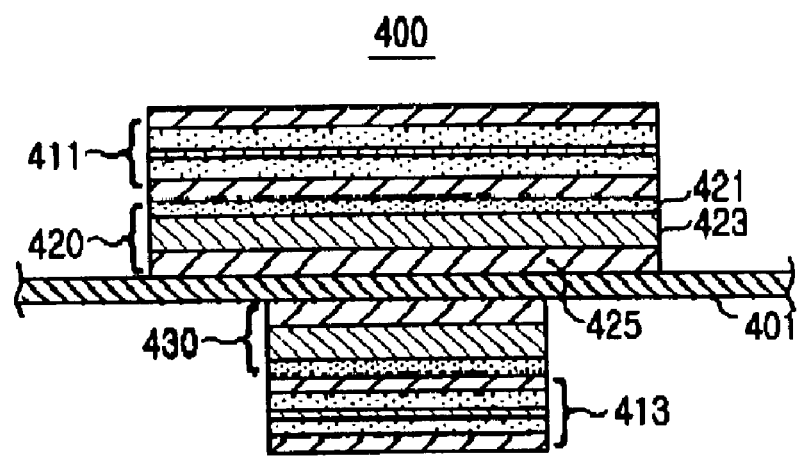
FIG. 4 is a cross sectional view illustrating another dual LCD with two separate backlighting devices according to the prior art.
Figure 5:
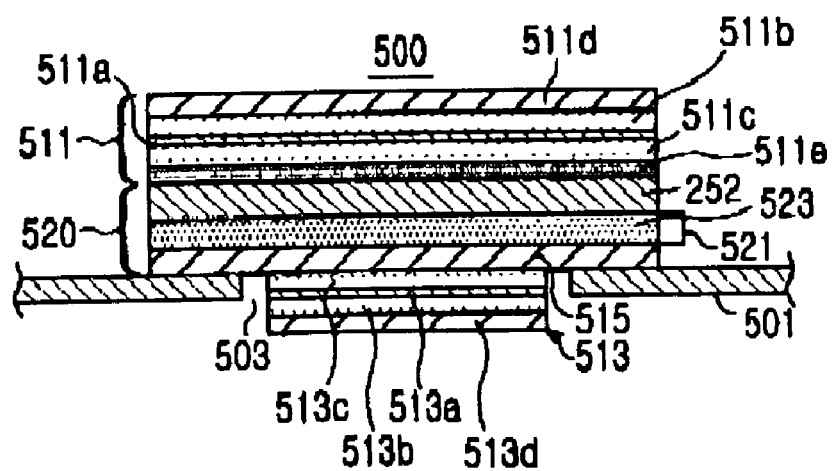
FIG. 5 is a cross sectional view illustrating a dual LCD with a single backlighting device according to a preferred embodiment of the present invention.

FIG. 5 is a cross sectional view of a dual LCD for mobile phone having a single backlighting device according to a preferred embodiment of the present invention. Referring to FIG. 5, a backlighting device according to a preferred embodiment of the present invention has a main LCD 511 and a slave LCD 513 installed on upper and lower faces of a circuit board 501, respectively. Further, the backlighting device includes a backlighting illumination device 520 for lighting both the main LCD 511 and the slave LCD 513. For the circuit board 501, a flexible printed circuit board (FPCB) is generally preferred for slimming of the mobile phone.

A bi-directional backlighting device according to the present invention includes a circuit board 501 with a through hole 503, a main LCD 511 for displaying first information, a slave LCD 513 for displaying second information, and a backlighting illumination device 520 for back-lighting both the main LCD 511 and the slave LCD 513. The main LCD 511 is mounted on one face of the circuit board 501 to radiate light in a first direction substantially perpendicular to an outer surface of the circuit board 501. The slave LCD 513 is mounted on another face of the circuit board 501, passing through the through hold 503, and situated to radiate light in a second direction substantially perpendicular to another outer surface of the circuit board 501. The backlighting illumination device 520 is provided between a lower face of the main LCD 511 and a lower face of the slave LCD 513.

The backlighting illumination device 520 includes a light emitting diode 521 provided between the main LCD 511 and the slave LCD 513 for emitting light, and a light guide plate 523 for transferring (guiding) light emitted from the light emitting diode 521 to the main LCD 511 and the slave LCD 513.

The light emitting diode 521, which may be for example red, blue, or white light emitting diode, is a light source of the backlighting illumination device 520 and emits light when a predetermined voltage is applied thereto. The light emitting diode 521 is installed adjacent to the main LCD 511 and the slave LCD 513, preferably adjacent to the light guide plate 523. Installed at a lower part of the main LCD 511, the light guide plate 523 transfers light emitted from the light emitting diode 521 to the entire lower part of the main LCD 511. Additionally, the backlighting illumination device 520 has a diffusion sheet 525 installed between the light guide plate 523 and the main LCD 511, for diffusing light transferred to the lower part of the main LCD 511.

The main LCD 511 includes liquid crystal 511a, upper and lower glasses 511b and 511c installed above and below the liquid crystal 511a, respectively, an upper polarizer 511d mounted on the upper glass 511b, and a semi-transparent lower polarizer 511e mounted on the lower glass 511c. The semi-transparent lower polarizer 511e is situated at the lowest side of the main LCD 511, functions as a reflection plate and transmits a portion of light transferred through the light guide plate 523 in the first direction.

The slave LCD 513 includes liquid crystal 513a, upper and lower glasses 513b and 513c installed above and below the liquid crystal 513a, respectively, an upper polarizer 513d mounted on the upper glass 513b, and a lower polarizer 515 mounted on the lower glass 513c. The lower polarizer 515 is situated between the backlighting illumination device 520 and the circuit board 501, is larger in size than the through hole 503, and faces a lower face of the backlighting illumination device 520. That is, a breadth of the lower polarizer 515 of the slave LCD 513 is constructed to be broader than a breadth of the slave LCD 513 and same as a breadth of the lower face of the backlighting illumination device 520. In addition, the lower polarizer 515 is attached to the lower face of the backlighting illumination device 520 as well as to the circuit board 501 and the lower glass 513c. The diffusion sheet 525 is installed between the light guide plate 523 and the main LCD 511, evenly diffusing light transferred through the light guide plate 523 to the main LCD 511.

As described above, light generated from the light emitting diode 521 is transmitted through the semi-transparent lower polarizer 511e to the light guide plate 523, and a portion of the light is transferred to the main LCD 511 in the first direction and the rest of the light is transferred to the slave LCD 513 in the second direction, so the user can view information displayed on the main LCD 511 and the slave LCD 513 even in dark places. In addition, the semi-transparent lower polarizer 511e performs polarizing and reflecting functions for the main LCD 511. Therefore, the backlighting device for a dual LCD according to a first embodiment of the present invention has a dual LCD slimmer than the existing dual LCD by constructing a semi-transparent polarizer as a lower polarizer.

Figure 6:
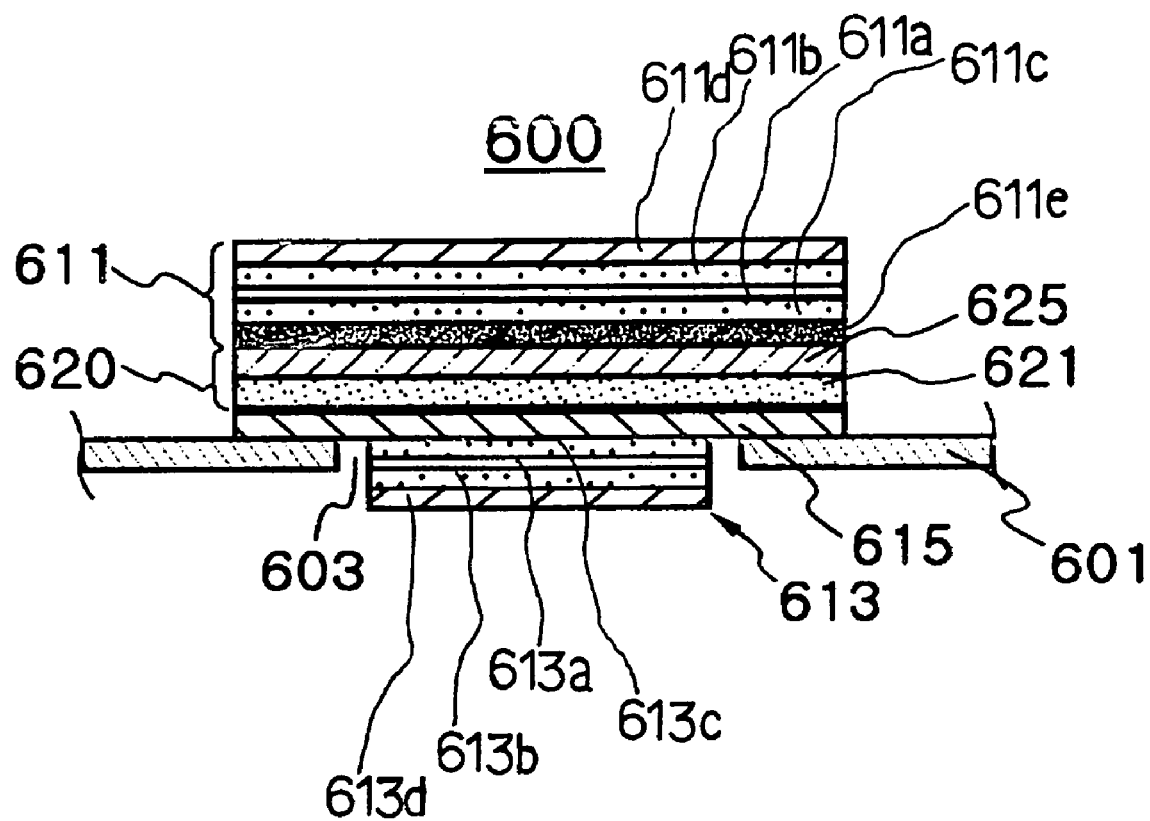
FIG. 6 is a cross sectional view illustrating a dual LCD with a single backlighting device according to another embodiment of the present invention.

FIG. 6 is a cross sectional view of a dual LCD for a mobile phone with a single backlighting device according to another embodiment of the present invention. Referring to FIG. 6, a dual LCD 600 includes a main LCD 611 and a slave LCD 613 installed on a circuit board 601, and a backlighting illumination device 620 illuminating the main LCD 611 in a first direction and the slave LCD 613 in a second direction. For the circuit board 601, a flexible printed circuit board (FPCB) is generally preferred for slimming of the mobile phone.

A backlighting illumination device 620 according to the present invention includes a circuit board 601 with a through hole 603, the main LCD 611 for displaying first information in the first direction, the slave LCD 613 for displaying second information in the second direction, and the backlighting illumination device 620 for back-lighting the main LCD 611 and the slave LCD 613 in the first and second directions, respectively. The main LCD 611 is mounted on one face of the circuit board 601. The slave LCD 613 is mounted on another face of the circuit board 601, passing through the through hold 603. The backlight illumination device 620 is provided between a lower face of the main LCD 611 and a lower face of the slave LCD 613. The backlighting illumination device 620 has an electro-luminescence sheet 621 situated between the main LCD 611 and the slave LCD 613, for providing light.

The electro-luminescence sheet 621 functions as a light source of the backlighting illumination device 620. The electro-luminescence sheet 621 is installed between the main LCD 611 and the slave LCD 613, preferably to contact a lower face of the slave LCD 613. Additionally, the backlighting illumination device 620 has a diffusion sheet 625 attached to the lower face of the main LCD 611, for diffusing light transferred to the lower face of the main LCD 611.

The main LCD 611 includes liquid crystal 611a, upper and lower glasses 611b and 611c installed respectively above and below the liquid crystal 611a, an upper polarizer 611d mounted on the upper glass 611b, and a semi-transparent lower polarizer 615 mounted on the lower glass 611c. The semi-transparent lower polarizer 615 functions as a reflection plate of the main LCD 611, and at the same time, transmits a portion of light transferred through the electro-luminescence sheet 621.

The slave LCD 613 includes liquid crystal 613a, upper and lower glasses 613b and 613c installed above and below the liquid crystal 613a, respectively, an upper polarizer 613d mounted on the upper glass 613b, and a lower polarizer 615 mounted on the lower glass 613c. The lower polarizer 615 is situated between the backlighting illumination device 620 and the circuit board 601, and is larger in size than the through hole 603, facing a lower face of the backlighting illumination device 620. That is, the lower polarizer 615 of the slave LCD 613 is constructed in a size broader than a breadth of the slave LCD 613 and in the same size as a breadth of the lower face of the backlighting illumination device 620. In addition, the lower polarizer 615 is attached to the lower face of the backlighting illumination device 620 and also to the circuit board 601 and the lower glass 613c.

The diffusion sheet 625 evenly diffuses light transferred through the electro-luminescence sheet 621 to the main LCD 611.

As described above, light generated from the electro-luminescence sheet 621 is transferred through the semi-transparent lower polarizer 611e to the main LCD 611 in the first direction and the rest of light is transferred to the slave LCD 613 in the second direction, so the user can view information displayed on the main LCD 611 and the slave LCD 613 even in dark places.

As can be understood from the foregoing two embodiments of the present invention, a backlighting device of a dual LCD for a mobile phone uses a semi-transparent lower polarizer that transmits a portion of light generated from a light source to a main LCD and further illuminates a slave LCD by transmitting the rest of light generated from the light source to the slave LCD. Therefore, the present invention does not necessitate a separate backlighting device to illuminate the slave LCD, by illuminating both the main LCD and the slave LCD using the semi-transparent lower polarizer.

While the invention has been shown and described with reference to a certain preferred embodiment thereof, it will be understood by those skilled in the art that various changes in form and details may be made therein without departing from the spirit and scope of the invention as defined by the appended claims. For example, the backlighting device for a dual LCD according to the present invention need not be limited to a specific folder-type mobile phone and can be applied to all kinds of folder-type portable devices.

As described above, a backlighting device for a dual LCD for a mobile phone according to the present invention is constructed to illuminate both the master LCD and the slave LCD using a semi-transparent lower polarizer, contributing to slimness of the duel LCD, especially slimness of the folder-type mobile phone. In addition, the backlighting device has the reduced number of parts, thereby securing more space for arranging the parts, decreasing production cost while increasing productivity at the same time.

What is claimed is:

1. A backlighting device for a dual LCD (Liquid Crystal Display), comprising:
   a circuit board having a hole located therein;
   a backlighting illumination device situated within the hole for radiating light in a first direction substantially perpendicular to a first face of the circuit board and in a second direction substantially perpendicular to a second face of the circuit board;
   a main LCD being situated on a first face of the backlighting illumination device in the first direction, for displaying first information in the first direction; and
   a slave LCD being situated on second face of the backlighting illumination device through the through hole in the second direction, for displaying second information in the second direction.

2. The backlighting device of claim 1, wherein the backlighting illumination device comprises:
   a light emitting diode being provided between the main LCD and the slave LCD; and
   a light guide plate for transferring light emitted from the light emitting diode to the main LCD and the slave LCD.

3. The backlighting device of claim 2, wherein the backlighting illumination device further comprises a diffusion sheet being installed between the light guide plate and the main LCD, for diffusing light transferred to a lower face of the main LCD.

4. The backlighting device of claim 1, wherein the main LCD comprises:
   liquid crystal;
   upper and lower glasses provided above and below the liquid crystal, respectively;
   an upper polarizer provided on the upper glass; and
   a semi-transparent lower polarizer provided on the lower glass.

5. The backlighting device of claim 1, wherein the slave LCD comprises:
   liquid crystal;
   upper and lower glasses provided above and below the liquid crystal, respectively;
   an upper polarizer provided on the upper glass; and
   a lower polarizer provided on the lower glass, situated between the backlighting illumination device and the circuit board, said lower polarizer having a size greater than the hole, the lower polarizer facing the backlighting device.

6. The backlighting device of claim 1, wherein the backlighting illumination device comprises an electro-luminescence sheet provided between a lower face of the main LCD and a lower face of the slave LCD.

7. The backlighting device of claim 6, wherein the electro-luminescence sheet further comprises a diffusion sheet installed at a lower face of the main LCD to diffuse light transferred to the lower face of the main LCD.

8. A folder-type mobile phone with a backlighting device for a dual LCD, comprising:
   a body;
   the backlighting device including;
      a circuit board having a hole located therein;
      a backlighting illumination device situated within the hole for radiating light in a first direction substantially perpendicular to a first face of the circuit board and in a second direction substantially perpendicular to a second face of the circuit board;
      a main LCD situated on first face of the backlighting illumination device in the first direction, for displaying first information in the first direction;
      a slave LCD situated on a second face of the backlighting illumination device and located within the hole in the second direction, for displaying second information in the second direction; and
   a folder rotatably foldable to the main body by a hinge device.

9. The folder-type mobile phone of claim 8, wherein the backlighting illumination device further comprises:
   a light emitting diode provided between the main LCD and the slave LCD, for emitting light; and
   a light guide plate for transferring light emitted from the light emitting diode to the main LCD and the slave LCD.

10. The folder-type mobile phone claim 9, wherein the backlighting illumination device further comprises a diffusion sheet installed between the light guide plate and the main LCD, for diffusing light transferred to a lower face of the main LCD.

11. The folder-type mobile phone of claim 8, wherein the main LCD comprises:
    liquid crystal;
    upper and lower glasses provided above and below the liquid crystal, respectively;
    an upper polarizer provided on the upper glass; and
    a semi-transparent lower polarizer provided on the lower glass.

12. The folder-type mobile phone of claim 8, wherein the slave LCD comprises:
    liquid crystal;
    upper and lower glasses provided above and below the liquid crystal, respectively;
    an upper polarizer provided on the upper glass; and
    a lower polarizer provided on the lower glass, situated between the backlighting illumination device and the circuit board, sad lower polarizer having a size greater than the hole, the lower polarizer facing the bi-directional backlighting device.

13. The folder-type mobile phone of claim 8, wherein the backlighting illumination device comprises an electro-luminescence sheet provided between a lower face of the main LCD and a lower face of the slave LCD.

14. The folder-type mobile phone of claim 13, wherein the electro-luminescence sheet further comprises a diffusion sheet installed at lower face of the main LCD to diffuse light transferred to the lower face of the main LCD.

* * * * *